US 11,410,168 B2

(12) United States Patent
Lyadvinsky et al.

(10) Patent No.: US 11,410,168 B2
(45) Date of Patent: Aug. 9, 2022

(54) METHOD FOR USER MANAGEMENT FOR BLOCKCHAIN-BASED OPERATIONS

(71) Applicant: ACRONIS INTERNATIONAL GMBH, Schaffhausen (CH)

(72) Inventors: Max Lyadvinsky, Moscow (RU); Alexey Raevsky, Moscow (RU); Anton Petrushkin, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 14 days.

(21) Appl. No.: 16/374,084

(22) Filed: Apr. 3, 2019

(65) Prior Publication Data
US 2020/0320529 A1 Oct. 8, 2020

(51) Int. Cl.
*G06Q 20/38* (2012.01)
*H04L 9/30* (2006.01)
*H04L 9/32* (2006.01)
*G06Q 20/08* (2012.01)

(52) U.S. Cl.
CPC ..... *G06Q 20/3829* (2013.01); *G06Q 20/0855* (2013.01); *G06Q 20/389* (2013.01); *H04L 9/30* (2013.01); *H04L 9/3252* (2013.01); *G06Q 2220/00* (2013.01); *H04L 2209/38* (2013.01); *H04L 2209/56* (2013.01)

(58) Field of Classification Search
CPC ........... G06Q 20/3829; G06Q 20/0855; G06Q 20/389; G06Q 2220/00; H04L 9/30; H04L 9/3252; H04L 2209/38; H04L 2209/56; H04L 9/3247; H04L 9/3239
See application file for complete search history.

(56) References Cited

U.S. PATENT DOCUMENTS

| | | | |
|---|---|---|---|
| 2019/0164153 A1* | 5/2019 | Agrawal | G06Q 20/065 |
| 2019/0220836 A1* | 7/2019 | Caldwell | G06Q 20/3829 |
| 2019/0354945 A1* | 11/2019 | Mahajan | G06Q 20/381 |
| 2020/0119916 A1* | 4/2020 | Pickhardt | H04L 9/3236 |

* cited by examiner

*Primary Examiner* — Jacob C. Coppola
(74) *Attorney, Agent, or Firm* — ArentFox Schiff LLP; Michael Fainberg (57) ABSTRACT

Systems and methods are provided for generating a blockchain smart contract for managing user accounts and electronic wallets storing cryptocurrency. The described system includes determining a public encryption key associated with a third-party organization configured to manage blockchain transactions on behalf of a first user account, generating a first transaction data structure having a destination address field that specifies a user-account smart contract module published to a distributed ledger, wherein the first transaction data structure is configured to invoke change ownership functionality of the user-account smart contract module using the determined public encryption key associated with the third-party organization, and publishing the first transaction data structure to the distributed ledger maintained by the blockchain network of nodes.

18 Claims, 6 Drawing Sheets

METHOD FOR USER MANAGEMENT FOR BLOCKCHAIN-BASED OPERATIONS

FIELD OF TECHNOLOGY

The present disclosure relates generally to the field of cryptocurrencies and blockchain-based transactions, more specifically, to systems and methods for managing user accounts for blockchain-based operations.

BACKGROUND

Cryptographic assets (also referred to as crypto assets) refer to a technology of digital assets that are managed using cryptographic techniques, for example, to secure the transactions of, control the creation of additional assets (i.e., "mining"), and verify the transfer of such assets. Examples of crypto assets may include cryptographic currency (cryptocurrency assets), utility tokens (e.g., app coins, user tokens), security tokens, or other similar assets. Blockchain technology is an emerging technology that has been used in cryptocurrency implementations. The blockchain is a data structure that stores a list of transactions and can be thought of as a distributed electronic ledger that records transactions between a source and a destination, or a sender and a recipient. The transactions are batched together into blocks and every block refers back to or is linked to a prior block in the chain. Computer nodes, sometimes referred to as miners, maintain the blockchain and cryptographically validate each new block (and the transactions contained therein) using a proof-of-work system or other schemes.

In blockchain-based operations, users' accounts can be represented by an "address", which is a unique identifier or value that is derived from a public encryption key used to control the respective account (e.g., hash of their public key). This approach means that their private encryption keys (of a public/private key pair) are maintained as secret. Such schemes works well when the users are acting (executing transactions) on their own. However, in some cases, the user is a customer of some financial organization (e.g., cryptocurrency wallet service provider), and this organization performs blockchain transactions on the user's behalf. In such cases, proper user management becomes difficult because of the security risks and inefficiencies involved in the transfer of private keys from one organization to another organization or to a user.

SUMMARY

Accordingly, aspects of the present disclosure address this difficulty and provide simple and flexible user management for blockchain-based transactions. A user account is represented by a "user-account" smart contract rather than by a simple address in blockchain transactions. The user-account smart contract is configured to store an owner field that holds a reference to the public encryption key of the account owner. The owner field can be used to reference the public encryption key of some financial organization (e.g., wallet service provider) that holds the user's account, or the public key of the users themselves. When the user decides to change ownership of their account, the account holder (e.g., the user, or the financial organization according to the user's instructions) calls a particular method (e.g., "changeOwner( )") of the user-account smart contract, passing to this method a reference to the public key of the new holder (e.g., the users themselves, or another financial organization.) The smart contract may have other methods (e.g., changeOwner, transfer, transferFrom, etc.) which use digital signature verification of the caller and are executed only when the caller is the smart contract's owner.

Thus, a system and method is disclosed herein for executing blockchain-based smart contracts, and, more particularly, for managing users accounts for blockchain-based operations. According to one aspect, a computer-implemented method is provided for executing a blockchain-based transaction for transferring ownership of a user account to a third-party organization is provided. The method includes determining a public encryption key associated with a third-party organization configured to manage blockchain transactions on behalf of a first user account. The method further includes generating a first transaction data structure having a destination address field that specifies a user-account smart contract module published to a distributed ledger, and publishing the first transaction data structure to the distributed ledger maintained by the blockchain network of nodes. The first transaction data structure is configured to invoke change ownership functionality of the user-account smart contract module using the determined public encryption key associated with the third-party organization.

In another aspect, the user-account smart contract module comprises computer-executable instructions configured to execute, at a server-side node of the blockchain network, the change ownership functionality that modifies an internal data store associated with the user-account smart contract module to store an account identifier derived from the public encryption key associated with the third-party organization.

In another aspect, the user-account smart contract module is assigned a contract address within the distributed ledger, and wherein the destination address field of the first transaction data structure is set to the contract address.

In another aspect, the change ownership functionality of the user-account smart contract module is configured to change ownership of the first user account without transferring a copy of a private encryption key associated with the first user account.

In another aspect, the method further includes generating a second transaction data structure for transferring cryptographic assets from the first user account to second target account using a token smart contract module published to the distributed ledger, wherein the second transaction data structure comprises a destination address field that specifies the user-account smart contract module.

In another aspect, the second transaction data structure further comprises a source address field that contains an account identifier derived from the public encryption key of the third-party organization, and a data field that comprises invocation of execute functionality of the user-account smart contract module using a first parameter and a second parameter, wherein the first parameter comprises a contract address of the token smart contract module, and the second parameter comprises an invocation of transfer functionality of the token smart contract module In another aspect, the execute functionality of the user-account smart contract module is further configured to verify that an account invoking the execute functionality matches an owner identifier stored by the user-account smart contract module.

In another aspect, the transfer functionality of the token smart contract module is configured to check that an account invoking the transfer functionality is authorized based on a public key recovery of a plurality of digital signature values associated with the account.

In another aspect, the second transaction data structure causes the token smart contract module to generate a third transaction data structure to transfer the cryptographic assets from the first user account to the second target account such that the first user account is represented by the user-account smart contract module in a source portion of the third transaction data structure and not a user account address.

According to another aspect of the present disclosure, a system for executing a blockchain-based transaction for transferring ownership of a user account to a third-party organization is provided. The system includes a memory and a hardware processor coupled to the memory. The hardware processor is configured to determine a public encryption key associated with a third-party organization configured to manage blockchain transactions on behalf of a first user account, and generate a first transaction data structure having a destination address field that specifies a user-account smart contract module published to a distributed ledger. The first transaction data structure is configured to invoke change ownership functionality of the user-account smart contract module using the determined public encryption key associated with the third-party organization. The processor is further configured to publish the first transaction data structure to the distributed ledger maintained by the blockchain network of nodes.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for executing a blockchain-based transaction for transferring ownership of a user account to a third-party organization. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
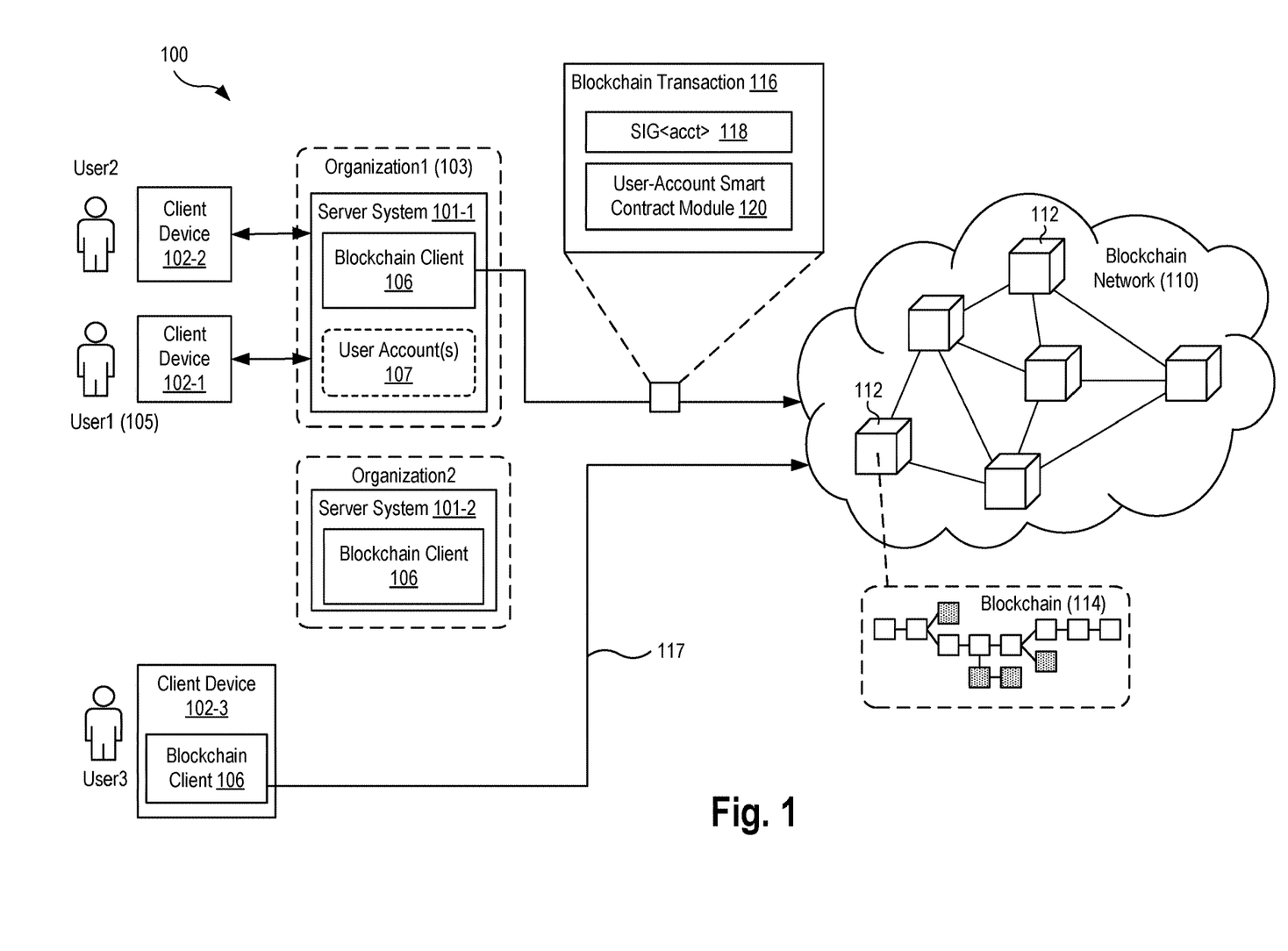
FIG. 1 is a block diagram of a system for user management for blockchain-backed operations, according to an exemplary aspect

FIG. 1 is a block diagram of a system 100 for user management for blockchain-backed operations, according to an exemplary aspect. The system 100 may include one or more server systems 101 associated with organizations 103, one or more client device(s) 102 associated with users and communicatively connected to the server system 101, and a blockchain network 110. In the example shown, a first server system 101-1 is associated with a first organization (Organization 1) and a second server system 101-2 is associated with a second, different organization (Organization 2). The organizations 103 can be cryptographic wallet server providers, financial organizations, or other service providers that can manage accounts having cryptographic asset on behalf of a user. The client device 102 (e.g., 102,-1, 102-2, 102-3) may be one of personal computers, servers, laptops, tables, mobile devices, smart phones, cellular devices, portable gaming devices, media players or any other suitable devices that can retain, manipulate and transfer data.

The server system 101 may include a blockchain client 106, which is a software application configured to generate and transmit one or more cryptocurrency or blockchain-based transactions to the blockchain network 110 for facilitating the management of user accounts 107, as well as the transfer of cryptographic assets to and from such user accounts. The client device 102 may include a similar blockchain client, shown as blockchain client 108. The blockchain client 106 is configured to manage an account (sometimes referred to as a "wallet") controlled by a private encryption key and having an account balance of cryptographic assets. In some aspects, the blockchain client 106 may manage an account by maintaining private and public encryption key pairs tied to an account, and generating a plurality of transaction data structures having a cryptographically-signed data package (e.g., signed by a private encryption key) that specify the transfer of cryptocurrency assets, generating unique cryptocurrency addresses to be used for transactions, and other related functionality.

According to an exemplary aspect, the blockchain network 110 can be a distributed peer-to-peer network formed from a plurality of nodes 112 (computing devices) that collectively maintain a distributed ledger, also referred to as a blockchain 114. The blockchain 114 is a continuously-growing list of data records hardened against tampering and revision using cryptography and is composed of data structure blocks that hold the data received from other nodes 112 or other client nodes, including the client device 102 and server systems 101 executing an instance of the blockchain client 106. The blockchain client 106 is configured to transmit data values to the blockchain network 110 as a transaction data structure 111, and the nodes 112 in the blockchain network records and validates/confirms when and in what sequence the data transactions enter and are logged in the existing blockchain 114. The transaction data structure 111 may contain computer-executable code, or a reference to computer-executable code stored in an existing blockchain entry, that is executed by a node in the blockchain network as part of the validation procedure. Every node in the decentralized system can have a copy of the growing blockchain 114, avoiding the need to have a centralized ledger managed by a trusted third party. Moreover, each of the nodes can validate the data/transactions, add hash values to their copy of the blockchain 114, and then broadcast these additions to other nodes in accordance with existing blockchain methodologies. In some aspects, the blockchain network 110 may be comprised of a mixture of "full" nodes and "partial" nodes. Full nodes may process the full blockchain and are validating and enforcing data integrity of the blockchain on a regular basis. Partial nodes, in contrast, are configured to interact with the blockchain in a lightweight manner, for example, by downloading block headers, and verifying only a small portion of what needs to be verified, using a distributed hash table as a database for trie nodes in place of its local hard drive. In one aspect, the blockchain clients 106 may be configured as partial nodes of the blockchain network, while other servers in the system 100 may be configured as full nodes.

In one aspect, the blockchain network 110 may be configured to facilitate user management for blockchain-based operations using certain blockchain transactions and smart contracts. As described in detail below, a user may be represented in a given transaction by a user-account smart contract module 120 (rather than by a simple address). For example, User1 may be represented as one of the parties in a transfer of cryptographic assets to or from User1 by the user-account smart control module 120. The user-account smart contract module 120 published to the blockchain contains functionality may be accessed (via blockchain transactions) to execute transfer operations, user account management operations, and other blockchain-backed operations, provided the requested operations passes an ownership verification process performed by the smart contract. As used herein, the term functionality may be computer-executable code configured to perform one or more specific tasks or operations, and which may be organized within a single computing subroutine (e.g., function, method, procedure), distributed across multiple subroutines, distributed across multiple objections, or some combination thereof. The user management features of the user-account smart contract module 120 may be especially useful in situations in which a user (e.g., User1, User2) has directed a third-party organization (e.g., Organization1) to perform blockchain-backed operations on their behalf, such as by using a blockchain client 106. The user management features of the user-account smart contract module 120 also be used by user account directly managed by the user themselves, such as in the case of the client device 102-3 associated with User3 and executing a blockchain client that published transactions 117, as shown in FIG. 1.

The blockchain client 106 of the server system 101 may be configured to manage a user account 107 controlled by a private encryption key owned by the user. The blockchain client 106 of the server system 101 may store a copy of each private and public encryption key associated with each respective account 107. In some aspects, a user account 107 has an account balance of cryptographic assets tracked by a token smart contract module published in the blockchain 114.

To set up a user account, the blockchain client 106 may be configured to generate one or more blockchain transactions 116 that contain a user-account smart contract modules 120 that is configured to manage ownership of an account, execute transfers of cryptographic tokens and assets between the account and another account, and verify ownership of the account for purposes of such transfers. The blockchain client 106 may deploy the user-account smart contract module 120 by transmitting the blockchain transaction 116 to one of the nodes 112 of the blockchain network 110, thereby publishing the user-account smart contract module 120 to the blockchain 114. When deployed to the blockchain 114, the user-account smart contract module 120 may be allocated a unique contract address associated with the smart contract. The contract address of the user-account smart contract module 120 may be formatted similarly to a hash of a public encryption key but does not have any mathematical relation to a corresponding private key (as a public key has). The contract address associated with the smart contract can be used to trigger the functionality provided by the smart contract. For example, the blockchain client 106 may send a blockchain transaction to the blockchain network having a recipient address field specifying the user-account smart contract module 120 and a payload specifying that the change ownership functionality is to be triggered and an input parameter of a reference to a public encryption key of the new owner. The user-account smart contract module 120 is a software module comprised of computer-executable instructions or code that is run by one of the nodes 112 of the blockchain network when triggered by certain messages or transactions from other nodes or clients (e.g., blockchain clients 106). The user-account smart contract module 120 includes computer-executable instructions for change ownership functionality (e.g., a changeOwner( ) method) that updates the ownership of a user account based on a given public encryption key of the party having control over the respective user account. In one aspect, each instance of a user-account smart contract module 120 may represent a single user account.

To transfer cryptographic assets, the blockchain client 106 may be directed to generate a blockchain transaction 116, which is a data structure specifying a transfer of cryptographic assets from one account (e.g., User1) to another account (e.g., User2). It is understood that the blockchain client 106 may be directed to generate the blockchain transaction for a transfer by a client device 102-1 (e.g., via a web interface, or application-based interface). The blockchain client 106 may publish the blockchain transaction 116 to the blockchain 114 by transmitting the blockchain transaction 116 to one of the nodes 112 of the blockchain network 110. The data structure of a blockchain transaction may include a plurality of data fields for facilitating and validating the transfer of cryptographic assets from a sender account to a recipient account, such as identifiers or addresses associated with each of the sender account and the recipient account, and the amount of cryptographic assets to be transferred from the sender to the recipient. In one aspect, to transfer assets from User1 (represented by the user-account smart contract) to User2, the recipient account field specifies a contract address of the user-account smart contract rather than an account address of User2. As described in greater detail later, a data payload field of the blockchain transaction invokes transfer functionality of the user-account smart contract 120 with parameters that specify the account address of User2 the recipient account. In doing so, the user-account smart contract 120 handles verification of whether a given party is allowed to perform such a transfer.

The blockchain client 106 may be configured to create a digital signature 118 that is stored within the blockchain transaction's data structure and that is generated using the private encryption key associated with the account (e.g., User1) and, for example, a predetermined set of the data fields of that same blockchain transaction 116. For example, the digital signature 118 ("SIG<account>") identifies the sender of the blockchain transaction 116 as the user User1, which can be cryptographically verified by the blockchain network using the corresponding public encryption key associated with the account 107.

Figure 2:
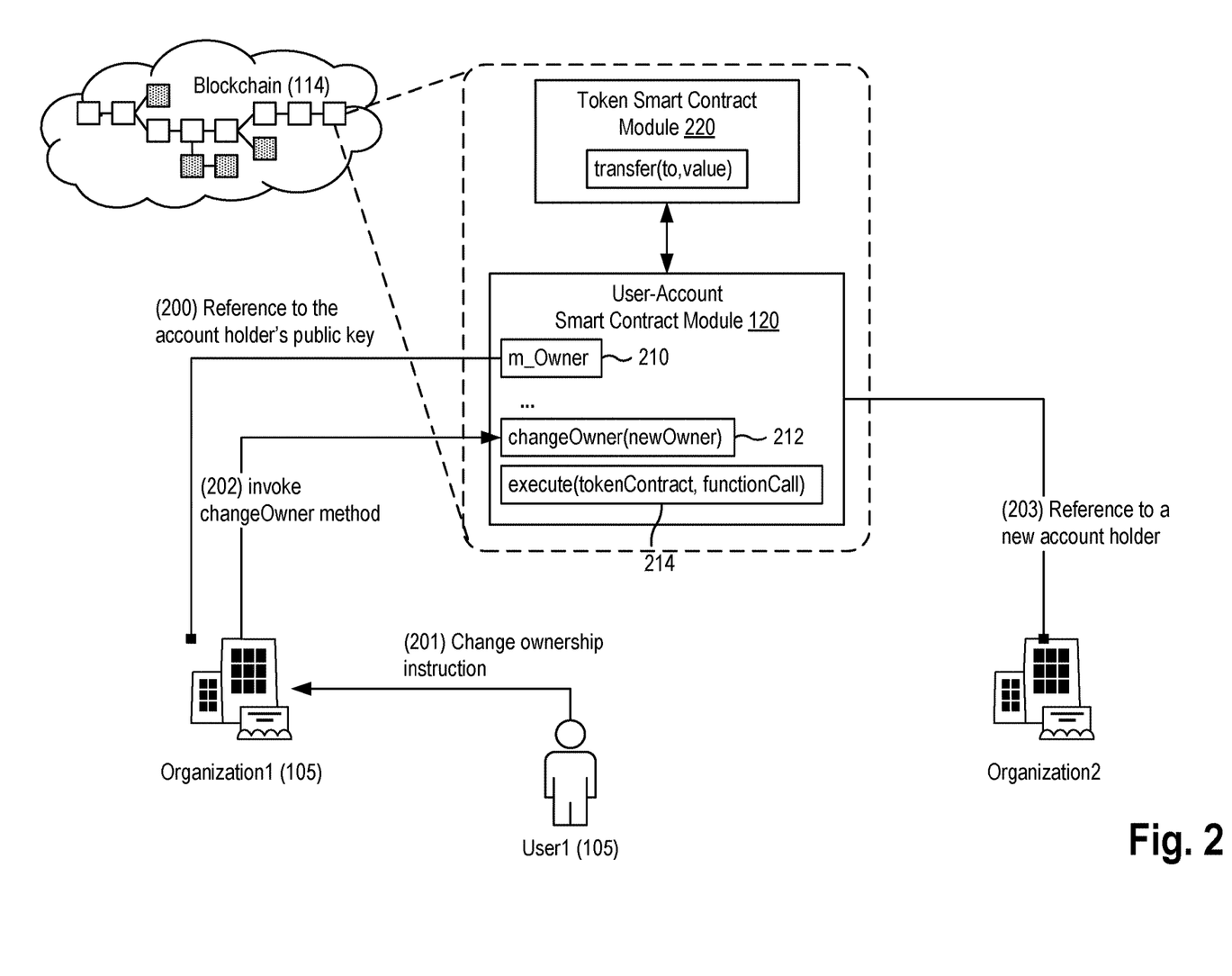
FIG. 2 is a block diagram depicting operations for changing ownership of a user account using a blockchain smart contract, according to an exemplary aspect.

FIG. 2 is a block diagram depicting operations for changing ownership of a user account using a blockchain smart contract, according to an exemplary aspect. As shown, the user-account smart contract module 120 is deployed within and published to the blockchain 114. The user-account smart contract module 120, as executing on a node of the blockchain network, includes an internal data store that is used to maintain state of the smart contract, in this instance, of state information related to the user account. In one aspect, the user-account smart contract module 120 includes an owner field 210 that stores a reference to the public encryption key of the account owner. In the depicted example, the owner field 210 holds a reference (200) to Organization) (105) that manages the account of the user (User1) on the user's behalf. Example pseudocode of a user-account smart contract module 120 is provided in Listing 1 below.

---
Listing 1: Pseudocode for Account Smart Contract
---

```
contract Account {
    address public Owner;
    int V;
    bytes R, S;
    event SingleTransact(address owner, int value, address to, address
        created);
    function execute(address to, bytes data, int value) public onlyOwner {
        address created;
        if (to == 0) {
            created = createAddress(value, data);
        } else {
            require (to.call.value(value)(data));
        }
        emit SingleTransact(msg.sender, to, created);
    }
    function createAddress(int value, bytes code) internal returns (address
    o_addr) {
        o_addr := create(value, add(code, 0x20), mload(code))
        if iszero(extcodesize(o_addr)) {
            revert(0,0)
        }
    }
    function getSigner( ) public view returns(address) {
        var hash = hashFunction(abi.encodePacked(address(this)));
        return ecrecover(hash, V, R, S);
    }
    function sign(int v, bytes r, bytes s) public onlyOwner {
        V = v;
        R = r;
        S = s;
    }
    function IsOwner( ) public view returns (bool) {
        return Owner == msg.sender;
    }
    modifier onlyOwner {
        if (isOwner( ))
            _;
    }
    function changeOwner(address _newOwner) public onlyOwner {
        Owner = _newOwner;
    }
    ...
}
```

In one implementation, the digital signature of the user-account smart contract module 120 comprises a "v", "r", and "s" component integer values that are output from an Elliptic Curve Digital Signature Algorithm (ECDSA) signature. The v, r, and s values can be used to recover the public key of the transaction signer for purposes of verifying a requester's authority to invoke functionality of the user-account smart contract module. It is understood that other implementations of digital signatures and cryptographic based techniques may be used to verify the authority of a party invoking the smart contract functionality.

When the user desires to change ownership of their account, say, to another organization (e.g., Organization2), the user 105 sends a change ownership instruction (201) to the server system of Organization1. In some aspects, the user 105 may operate a client (e.g., web browser, application) executing on a client device 102 to transmit a change ownership instruction (action 201), which directs the blockchain client 106 executing on the server system 101 of the organization 103 to transmit a blockchain transaction data structure having a destination address field that specifies the contract address of the user-account smart contract (action 202). This blockchain transaction may invoke change ownership functionality 212 (e.g., "changeOwner(newOwner)") of the user-account smart contract module 120, passing to this method a reference to the public key of the new holder, Organization2. The change ownership functionality may include a check that the sender of the change ownership is the current owner of the user account by verifying that the digital signature of the change ownership transaction corresponds to the public encryption key found in the owner field 210. If so, the change ownership functionality is configured to update the internal store of the smart contract to store a new account identifier value derived from the public encryption key associated with Organization2, which was passed as a parameter (e.g., "newOwner") of the changeOwner( ) method (action 203).

In one aspect, the user-account smart contract module 120 may include transfer functionality configured to transfer some amount of cryptographic assets owned by the user account to another user account (which may could itself could be represented by a user-account smart contract). In another aspect, the user-account smart contract module 120 may include generalized execute functionality 214 (e.g., "execute( )") configured to invoke, on behalf of the user account, functionality of other smart contracts. There may be other smart contract modules that are each deployed to the blockchain 114, and that interact with each other by calling or sending digital messages via the blockchain.

Some aspects of the present disclosure may include an inherited arrangement that provides additional logical functions to the described smart contract modules. For example, rather than include the changeOwner functionality, onlyOwner modifier, and signature-related functionality within a single smart contract module, some implementation may use an Account smart contract (which represents a user) and inherited contracts, such as an Attested smart contract (which stores v,r,s values) and an Owned smart contract (which stores an owner's address of contracts). Such an inherited arrangement may be provided with additional logical functions, such as changing a private key in one single step (i.e., only by changing an owner in a User-Account smart contract for the Company.) That is, the user-account smart contract module may include a change ownership functionality (e.g., changeOwner function) that has an "onlyOwner" modifier and that sets the internally stored value of the smart contract's owner to a user-specific new owner parameter. After this step, only the owner of the smart contract can use this contract, and it is understood that the owner should have a private encryption key related to the public encryption key that is designated as the owner's address. In cases in which a user account smart contract lists an owner address that corresponds to a different smart contract instance (e.g., nested Account smart contract modules), the owner should have the private encryption key corresponding to the public encryption key that is designated as the owner's address of that other smart contract instance.

The blockchain 114 may further include an instance of a token smart contract module 220 that defines a cryptographic asset (i.e., token, coin) and includes transfer functionality that defines rules and procedures for transferring the defined cryptographic assets from one account to another account. In some implementations, the Token smart contract module 220 may be configured as an ERC20-compliant smart contract, i.e., implements an ERC20 Token Standard Interface that defines functions and events that an Ethereum token contract has to implement. To effectuate a transfer using the user-account smart contract, a blockchain client 106 generates and transmits a transaction data structure that invokes the execute functionality 214 specifying parameters such as: a contract address of the Token smart contract module 220, a "value" of cryptographic tokens used to invoke execute functionality within the blockchain (e.g., Ethereum gas), and a function call which itself may have parameters such as a transfer method of the Token smart contract (e.g., "transfer(to, value)"). Specific examples of transfers are shown in FIGS. 3A to 3C below.

Figure 3A:
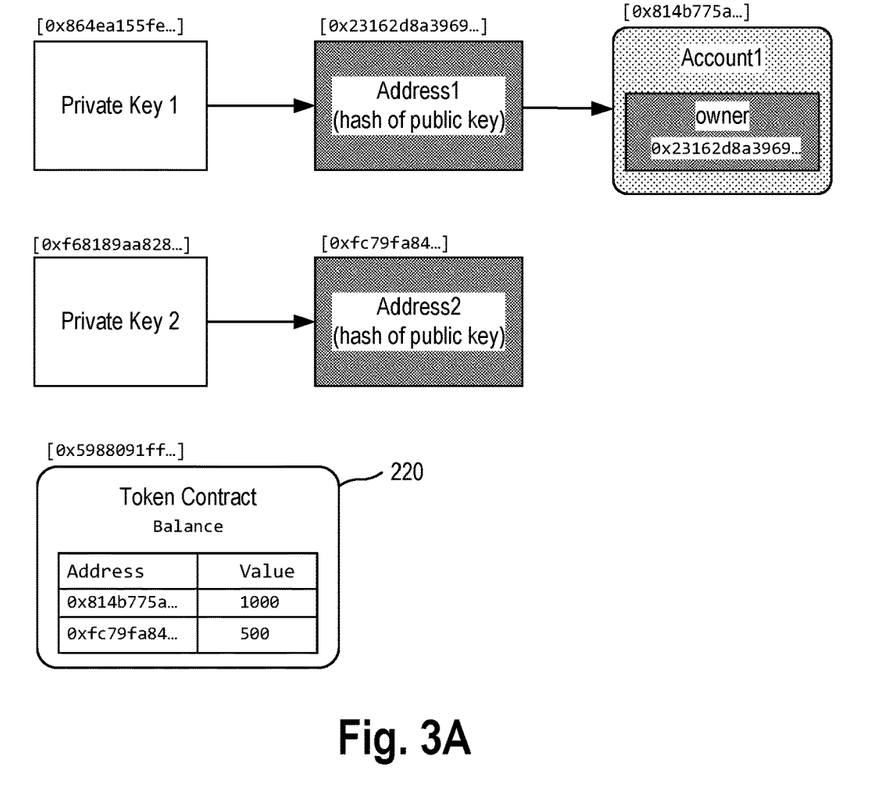
FIGS. 3A, 3B, and 3C are block diagrams depicting a view of private keys, account addresses, and account smart contract, according to an exemplary aspect.
Figure 3B:
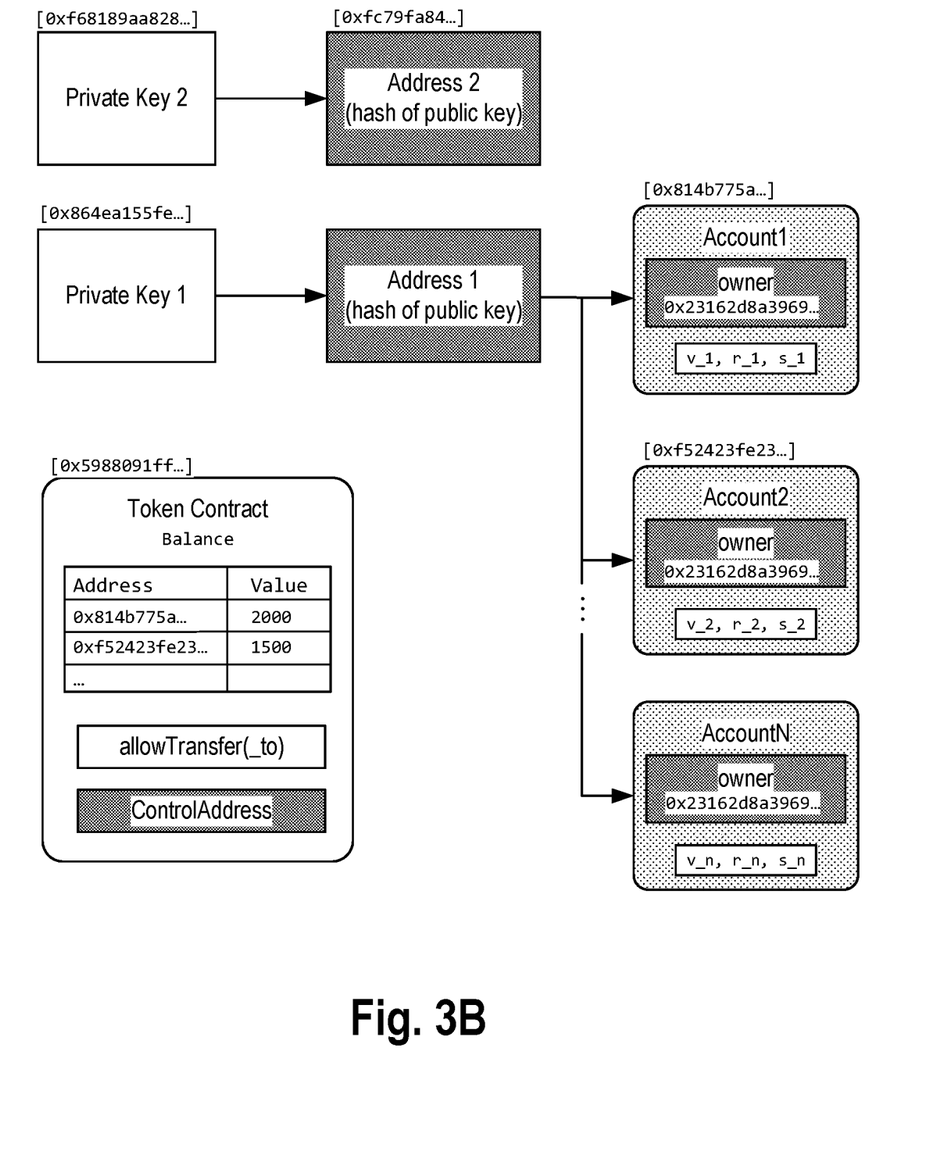
Figure 3C:
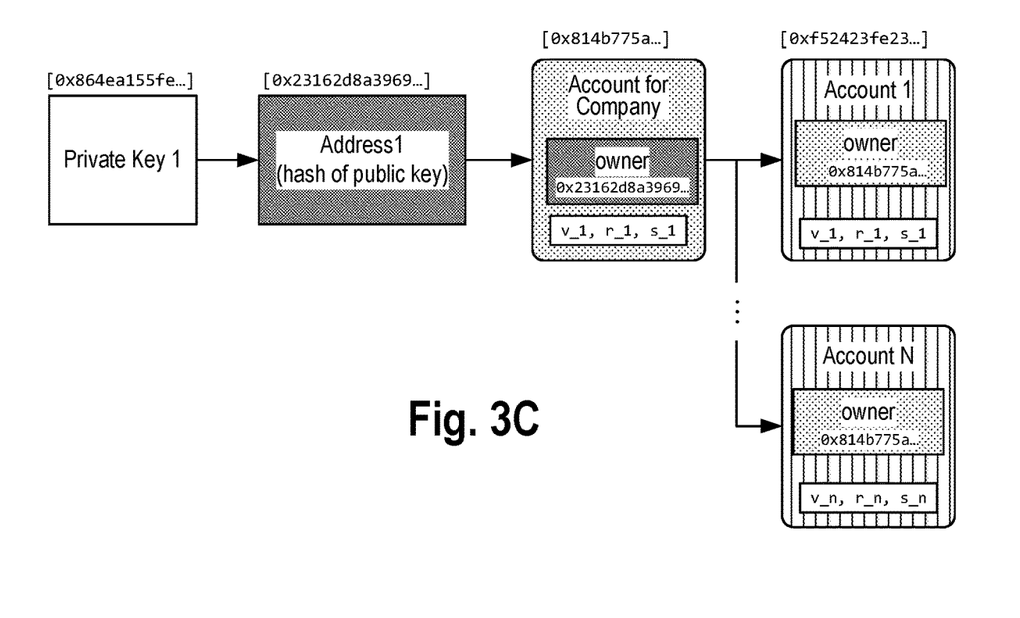

FIGS. 3A, 3B, and 3C are block diagrams depicting a view of private keys, account addresses, and account smart contract, according to an exemplary aspect. As shown in FIG. 3A, one user (User2) may have a user account which is controlled by a private encryption key (e.g., Private Key 2 or "0xf68189aa828 . . . ") possessed by User2. Address2 (e.g., "0xfc79fa84 . . . ") is an account identifier that is a hash of a public encryption key which is calculated from the private encryption key. Address2 represents the account of User2 in the blockchain.

According to one aspect, another user (User1) may have a user account which is controlled by a private encryption key (e.g., "0x864ea155fe . . . ") possessed by User1. Address1 (e.g., "0x23162d8a3969 . . . ") is an account identifier derived from the public encryption key (corresponding to the private encryption key) and is calculated, for example, as a hash of a portion or all of the public encryption key. Account1 refers to an instance of a user-account smart contract (published to the blockchain) that is generated from Address1 and represents User1. As shown, Account1 may store Address1 in an owner field to track the current owner of Account1 as "0x23162d8a3969". Account1 may be allocated a unique contract address (such as "0x814b775a . . . "), which represents the user account to other users and/or to other smart contracts.

A Token smart contract 220 published in the blockchain stores a balance of some tokens defined by the token smart contract 220. The Token smart contract 220 may have its own contract address (e.g., "0x5988091ff . . . ") that uniquely identifies the token smart contract within the blockchain. In the example shown, the Token smart contract indicates that User1 represented by Account1 (e.g., "0x814b775a . . . ") has a balance of 1000 tokens, and User2 represented by Address2 (e.g., "0xfc79fa84 . . . ") has a balance of 500 tokens.

In one example transaction, User2 (represented by Address2 "0xFc79fA84 . . . ") transfers 300 tokens to User1 (represented by Account1 "0x814B775A . . . ") in the Token smart contract (represented by contract address "0x5988091ff . . . ") by generating and publishing to the blockchain a transaction data structure as follows:
  from: 0xFc79fA84 . . .
  to: 0x5988091ff . . .
  data: transfer(0x8146775A . . . ,300)

As shown, Transaction #1 includes a from: field specifying the sender of the transfer is an address "0xFc79fA84 . . . " associated with User2, a to: field specifying the contract address of the Token smart contract (0x5988091ff . . . ), and a data field specifying a method call that invokes transfer functionality of the Token smart contract, which causes nodes of blockchain network to execute such functionality as specified. The method call has a first parameter specifying the recipient of the transfer is the contract address ("0x5988091ff . . . ") of the Account1 smart contract and a second parameter specifying the amount of the tokens to be transferred to the recipient. Transaction #1 is digitally signed by Private Key 2, and ETH for mining transaction will be spent from User 2 (0xFc79fA84 . . . ).

In another example transaction, User1 (0x814B775A . . . ) transfers 500 tokens to User2 (0xFc79fA84 . . . ) in the Token smart contract (0x5988091ff . . . ) by generating and publishing to the blockchain a transaction data structure as follows:
  from: 0x23162D8A . . .
  to: 0x81413775A . . .
  data: execute(0x5988091ff . . . , transfer (0xFc79fA84 . . . , 500) )

As shown, Transaction #2 includes a from: field specifying the sender of the transfer is Address1 (hash of the public key, "0x23162D8A . . . ") associated with User1, a to: field specifying Account1, i.e., the contract address of the user-account smart contract ("0x814b775a . . . "), and a data field specifying a method call that invokes execute functionality of the user-account smart contract, which causes nodes of blockchain network to execute such functionality as specified. The execute functionality may be configured to be used only by the Owner (i.e., the address that is stored in the User Account smart contract). The method call has a first parameter specifying the contract address of the Token smart contract ("0x5988091ff . . . ") that manages the transfer, and another parameter which is itself a transfer method call for the Token smart contract. The transfer method call specifies the recipient of the transfer using the user account address (Address2, or "0xFc79fA84 . . . ") associated with User2 and the amount of the tokens to be transferred to the recipient (500). Transaction #2 is digitally signed by Private Key 1, and ETH for mining transaction will be spent from User 1 (0x23162D8A . . . ). Execute function can be used only by Owner (it is an address that is stored in Account).

FIG. 3B depicts another example of a plurality of accounts (Account1, Account2, AccountN) owned by a single User1. As shown, each of the N Accounts can represent users in the blockchain. In some aspects, a cryptographic set of variables, such as generated by an Elliptic Curve Digital Signature Algorithm (ECDSA) (e.g., private key and hash of public key) can represent a Company (i.e., organization 103). As shown in FIG. 3B, the Token smart contract published in the blockchain stores a balance mapping indicating that Account1 represented by the contract address "0x814b775a . . . " has a balance of 2000 tokens, and Account2 represented by "0xf52423fe23 . . . ") has a balance of 1500 tokens. The Token smart contract may further include a control address field storing an address (e.g., derived from an encryption key) that is used to sign users' contracts. The control address may be an address of the company or serviced provider that works with user contracts. In the example shown in FIG. 3B, the control address may equal the value of Address 1.

It is understood that aspects of the present disclosure can be extended to inherit this structure to create an Account for a Company, as shown in FIG. 3C. That is, multiple instances of user-account smart contract can be deployed to the blockchain which list as their current owner a contract address (e.g., "0x814b775a . . . ") of a user-account smart contract owned by the user. In some aspects, such an inherited arrangement may be provided with additional logical functions, such as changing a private key, as discussed earlier.

As shown in FIGS. 3B and 3C, each of the instances of the user-account smart contract includes special variables which are received by digitally signing its addresses. Such special variables (e.g., signature values "r", "s", and variable "v") are the output of an ECSDA signature, and may be used to perform a process of public key recovery by the Tokens smart contract.

Listing 2 below provides example pseudocode for a Tokens smart contract.

---

Listing 2: Pseudocode for Token Smart Contract

```
Contract Token is ERC20 {
   ...
   function transfer(address _to, int _value) public allowTransfer(_to)
      returns (bool success) {
         require(balances[msg.sender] >= _value);
         balances[msg.sender] -= _value;
         balances[_to] += _value;
         emit Transfer(msg.sender, _to, _value);
         return true;
   }
   function transferFrom(address _from, address _to, int _value) public
      allowTransfer(_to) returns (bool) {
         require(balances[_from] >= _value &&
         allowed[_from][msg.sender] >=
         _value);
         balances[_to] += _value;
         balances[_from] -= _value;
         allowed[_from][msg.sender] -= _value;
         emit Transfer(_from, _to, _value);
         return true;
   }
   function approve(address _spender, int _value) public
      allowTransfer(_spender) returns (bool) {
         allowed[msg.sender][_spender] += _value;
         emit Approval(msg.sender, _spender, _value);
         return true;
   }
   function IsAttestedAccount(address _account) public view
   returns(bool) {
         Account a = Account(_account);
         uint8 v;
         bytes32 r;
         bytes32 s;
         (v, r, s) = a.GetSignature( );
         byte532 hash = keccak256(abi.encodePacked(address(_account)));
         return ecrecover(hash, v, r, s) == ControlAddress ;
   }
   function AllowedForSpending(address _dest) public view
   returns(bool) {
         return IsAttestedAccount(_dest);
   }
   modifier allowTransfer(address _dest) {
         if (AllowedForSpending(_dest)) {
            _;
         }
   }
   ...
}
```

---

As shown in Listing 2, the Token Smart Contract includes a modifier "allowTransfer(_to)" that is configured to check whether a requesting party is permitted to change any data in this contract or allowed to spend tokens of this contract (e.g., via the transfer( ) functionality, transferFrom( ) functionality, or approve( ) functionality). As shown in the IsAttestedAccount( ) method, the Token smart contract is configured to retrieve signature values "v, r, s" that are stored in each user-account smart contract, and that are unique because the technique signs by account address (unique) by Private Key 1 associated with User1. A process of public key recovery is performed on the signature values v, r, s to determine whether the recovery value matches the ControlAddress field from Address that is used to be a destination address in the Token smart contract. Following the example describes in FIG. 3A, the check verifies that the ControlAddress matches Address1.

Figure 4:
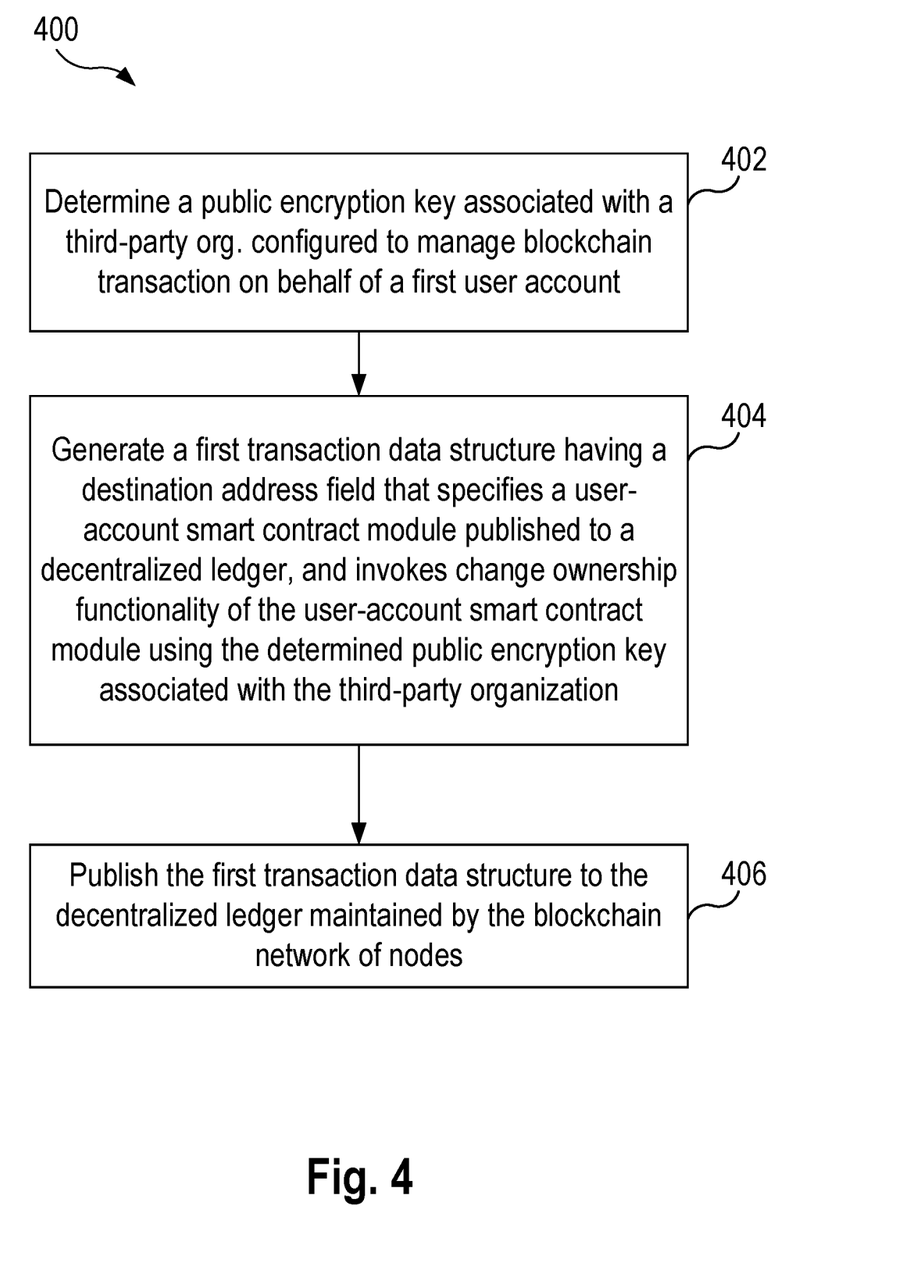
FIG. 4 is a flowchart of a method for executing a blockchain-based transaction according to an exemplary aspect.

FIG. 4 is a flowchart of a method 400 for executing a blockchain-based transaction according to an exemplary aspect. It is noted that the following description of the exemplary method makes reference to the system and components described above. At step 402, the blockchain client determines a public encryption key associated with a third-party organization configured to manage blockchain transactions on behalf of a first user account.

At step 404, the blockchain client generates a first transaction data structure having a destination address field that specifies a user-account smart contract module published to a distributed ledger. The first transaction data structure is configured to invoke change ownership functionality of the user-account smart contract module using the determined public encryption key associated with the third-party organization. In some aspects, the user-account smart contract module comprises computer-executable instructions configured to execute, at a server-side node of the blockchain network, the change ownership functionality that modifies an internal data store associated with the user-account smart contract module to store an account identifier derived from the public encryption key associated with the third-party organization. In some aspects, wherein the user-account smart contract module is assigned a contract address within the distributed ledger, and wherein the destination address field of the first transaction data structure is set to the contract address.

At step 406, the blockchain client publishes the first transaction data structure to the distributed ledger maintained by the blockchain network of nodes. In some aspects, wherein the change ownership functionality of the user-account smart contract module is configured to change ownership of the first user account without transferring a copy of a private encryption key associated with the first user account.

In one aspect, the blockchain client may generate a second transaction data structure for transferring cryptographic assets from the first user account to second target account using a token smart contract module published to the distributed ledger. The second transaction data structure comprises a destination address field that specifies the user-account smart contract module. The second transaction data structure further includes a source address field that contains an account identifier derived from the public encryption key of the third-party organization, and a data field that comprises invocation of execute functionality of the user-account smart contract module using a first parameter and a second parameter. The first parameter comprises a contract address of the token smart contract module, and the second parameter comprises an invocation of transfer functionality of the token smart contract module. In some aspects, the execute functionality of the user-account smart contract module is further configured to verify that an account invoking the execute functionality matches an owner identifier stored by the user-account smart contract module. In some aspects, transfer functionality and approve functionality of the token smart contract module is configured to (e.g., via an "allowedTo" modifier) check whether a requesting party is permitted to change data in the token smart contract module according to a public key recovery on the v, r, and s values associated with the user accounts.

In some aspects, the second transaction data structure causes the token smart contract module to generate a third transaction data structure to transfer the cryptographic assets from the first user account to the second target account such that the first user account is represented by the user-account smart contract module in a source portion of the third transaction data structure and not a user account address.

Figure 5:
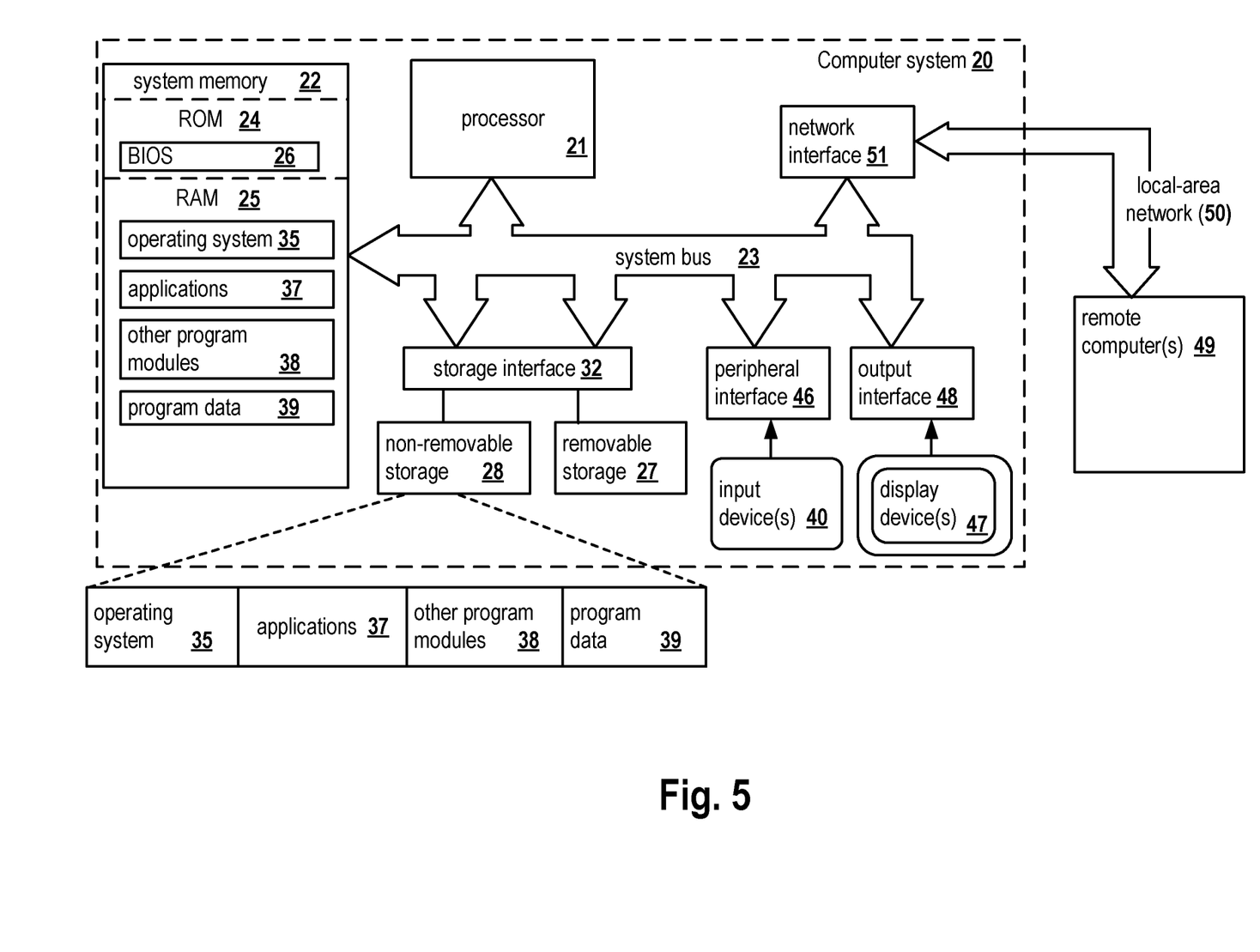
FIG. 5 is a block diagram of a computer system on which the disclosed system and method can be implemented according to an exemplary aspect.

FIG. 5 is a block diagram illustrating a computer system 20 on which aspects of systems and methods for executing a blockchain-based transaction for transferring ownership of a user account to a third-party organization may be implemented in accordance with an exemplary aspect. It should be noted that the computer system 20 can correspond to the server system 101 or the client device 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for executing a blockchain-based transaction for transferring ownership of a user account from a first third-party organization to a second third-party organization, the method comprising:
   determining a public encryption key of the second third-party organization that is comprised of a server system with a blockchain client configured to manage blockchain transactions on behalf of a plurality of user accounts;
   generating a first transaction data structure having a destination address field that specifies a user-account smart contract module published to a distributed ledger, wherein the first transaction data structure is configured to invoke change ownership functionality of the user-account smart contract module, and wherein the change ownership functionality transfers, using the determined public encryption key of the second third-party organization, the ownership of the user account to the second third-party organization without transferring a copy of a private encryption key of the user account to the second third-party organization; and
   publishing the first transaction data structure to the distributed ledger maintained by a blockchain network of nodes.

2. The method of claim 1, wherein the user-account smart contract module comprises computer-executable instructions configured to execute, at a server-side node of the blockchain network, the change ownership functionality that modifies an internal data store associated with the user-account smart contract module to store an account identifier derived from the public encryption key associated with the second third-party organization.

3. The method of claim 1, wherein the user-account smart contract module is assigned a contract address within the distributed ledger, and wherein the destination address field of the first transaction data structure is set to the contract address.

4. The method of claim 1, further comprising:
generating a second transaction data structure for transferring cryptographic assets from the user account to second target account using a token smart contract module published to the distributed ledger, wherein the second transaction data structure comprises a second destination address field that specifies the user-account smart contract module.

5. The method of claim 4, wherein the second transaction data structure further comprises a source address field that contains an account identifier derived from the public encryption key of the second third-party organization, and a data field that comprises invocation of execute functionality of the user-account smart contract module using a first parameter and a second parameter,
wherein the first parameter comprises a contract address of the token smart contract module, and the second parameter comprises an invocation of transfer functionality of the token smart contract module.

6. The method of claim 5, wherein the execute functionality of the user-account smart contract module is further configured to verify that an account invoking the execute functionality matches an owner identifier stored by the user-account smart contract module.

7. The method of claim 5, wherein the transfer functionality of the token smart contract module is configured to check that an account invoking the transfer functionality is authorized based on a public key recovery of a plurality of digital signature values associated with the account.

8. The method of claim 4, wherein the second transaction data structure causes the token smart contract module to generate a third transaction data structure to transfer the cryptographic assets from the user account to the second target account such that the user account is represented by the user-account smart contract module in a source portion of the third transaction data structure and not a user account address.

9. A system for executing a blockchain-based transaction for transferring ownership of a user account from a first third-party organization to a second third-party organization, the system comprising:
a memory; and
a hardware processor coupled to the memory and configured to:
determine a public encryption key of the second third-party organization that is comprised of a server system with a blockchain client configured to manage blockchain transactions on behalf of a plurality of user accounts;
generate a first transaction data structure having a destination address field that specifies a user-account smart contract module published to a distributed ledger,
wherein the first transaction data structure is configured to invoke change ownership functionality of the user-account smart contract module, and wherein the change ownership functionality transfers, using the determined public encryption key of the second third-party organization, the ownership of the user account to the second third-party organization without transferring a copy of a private encryption key of the user account to the second third-party organization; and
publish the first transaction data structure to the distributed ledger maintained by a blockchain network of nodes.

10. The system of claim 9, wherein the user-account smart contract module comprises computer-executable instructions configured to execute, at a server-side node of the blockchain network, the change ownership functionality that modifies an internal data store associated with the user-account smart contract module to store an account identifier derived from the public encryption key associated with the second third-party organization.

11. The system of claim 9, wherein the user-account smart contract module is assigned a contract address within the distributed ledger, and wherein the destination address field of the first transaction data structure is set to the contract address.

12. The system of claim 9, wherein the processor is further configured to generate a second transaction data structure for transferring cryptographic assets from the user account to second target account using a token smart contract module published to the distributed ledger, wherein the second transaction data structure comprises a second destination address field that specifies the user-account smart contract module.

13. The system of claim 12, wherein the second transaction data structure further comprises a source address field that contains an account identifier derived from the public encryption key of the second third-party organization, and a data field that comprises invocation of execute functionality of the user-account smart contract module using a first parameter and a second parameter,
wherein the first parameter comprises a contract address of the token smart contract module, and the second parameter comprises an invocation of transfer functionality of the token smart contract module.

14. The system of claim 13, wherein the execute functionality of the user-account smart contract module is further configured to verify that an account invoking the execute functionality matches an owner identifier stored by the user-account smart contract module.

15. The system of claim 13, wherein the transfer functionality of the token smart contract module is configured to check that an account invoking the transfer functionality is authorized based on a public key recovery of a plurality of digital signature values associated with the account.

16. The system of claim 12, wherein the second transaction data structure causes the token smart contract module to generate a third transaction data structure to transfer the cryptographic assets from the first user account to the second target account such that the user account is represented by the user-account smart contract module in a source portion of the third transaction data structure and not a user account address.

17. A non-transitory computer readable medium comprising computer-executable instructions for executing a blockchain-based transaction for transferring ownership of a user account from a first third-party organization to a second third-party organization, including instructions for:
determining a public encryption key of the second third-party organization that is comprised of a server system with a blockchain client configured to manage blockchain transactions on behalf of a plurality of user accounts;

generating a first transaction data structure having a destination address field that specifies a user-account smart contract module published to a distributed ledger, wherein the first transaction data structure is configured to invoke change ownership functionality of the user-account smart contract module, and wherein the change ownership functionality transfers, using the determined public encryption key of the second third-party organization, the ownership of the user account to the second third-party organization without transferring a copy of a private encryption key of the user account to the second third-party organization; and publishing the first transaction data structure to the distributed ledger maintained by a blockchain network of nodes.

18. The non-transitory computer readable medium of claim 17, further comprising:

generating a second transaction data structure for transferring cryptographic assets from the user account to second target account using a token smart contract module published to the distributed ledger, wherein the second transaction data structure comprises a second destination address field that specifies the user-account smart contract module, wherein the second transaction data structure further comprises a source address field that contains an account identifier derived from the public encryption key of the second third-party organization, and a data field that comprises invocation of execute functionality of the user-account smart contract module using a first parameter and a second parameter, wherein the first parameter comprises a contract address of the token smart contract module, and the second parameter comprises an invocation of transfer functionality of the token smart contract module.

* * * * *